United States Patent [19]

Bonnome

[11] Patent Number: 4,532,140
[45] Date of Patent: Jul. 30, 1985

[54] METHOD OF MANUFACTURING AND PROCESSING ALCOHOLIC BEVERAGES, AND ALCOHOLIC LIQUIDS OBTAINED BY PERFORMING THE METHOD

[75] Inventor: Jean-Pierre Bonnome, Fontenay sous Bois, France

[73] Assignee: Union de Brasseries, France

[21] Appl. No.: 476,934

[22] Filed: Mar. 21, 1983

[30] Foreign Application Priority Data

Mar. 24, 1983 [FR] France ................. 82 05038

[51] Int. Cl.$^3$ ............... C12C 11/04; C12G 3/10; C12H 1/04
[52] U.S. Cl. ........................ 426/13; 426/14; 426/16; 426/29; 426/271; 426/592; 426/490
[58] Field of Search ........... 426/11, 13, 14, 16, 426/29, 271, 592, 490, 493, 495; 435/161

[56] References Cited

U.S. PATENT DOCUMENTS 3,323,919  6/1967  Malick ................. 426/16
3,379,534  4/1968  Gablinger ............. 426/592
4,156,025  5/1979  Dalgleish ............. 426/271
4,316,956  2/1982  Lützen ................ 435/161

*Primary Examiner*—Robert Yoncoskie
*Assistant Examiner*—Marianne S. Minnick
*Attorney, Agent, or Firm*—Kane, Dalsimer, Kane, Sullivan and Kurucz

[57] ABSTRACT

An alcoholic liquid obtained by fermenting a must or a wort is initially subjected to ultrafiltration or to reverse osmosis to obtain a permeate which contains a higher proportion of water and alcohol than the starting liquid and a concentrate which contains a higher proportion of the substances that flavor the starting liquid. The permeate is then subjected to reverse osmosis using a membrane which is substantially impermeable to alcohol, while still being permeable to water. The concentrate from the second step is added to the concentrate from the first step to produce a liquid which has a higher concentration of alcohol than the starting liquid. The resulting liquid may be useable at said higher concentration as a beverage, or it may be used for transport and/or for storage, with water being added to thereto to restore the beverage substantially to its starting condition before being drunk.

10 Claims, No Drawings

METHOD OF MANUFACTURING AND PROCESSING ALCOHOLIC BEVERAGES, AND ALCOHOLIC LIQUIDS OBTAINED BY PERFORMING THE METHOD

The present invention relates to a method of manufacturing and of processing alcoholic beverages and to alcoholic liquids, including beverages, obtained by performing the method.

BACKGROUND OF THE INVENTION

There are numerous alcoholic beverages which are obtained by fermenting various sugar-containing juices, with the degree of alcohol in the end product depending on the amount of sugar in the initial juice.

Some drinks, particularly whisky and wine, are often diluted with some quantity of water just before being drunk.

With other drinks, and particularly with beer, hygienic or other considerations make it desirable to obtain a drink which has a very low degree of alcohol, but which otherwise retains the taste of the conventional drink.

For this purpose, proposals have been made to reduce the alcohol content of beer by means of reverse osmosis or hyperfiltration, or even by means of ultrafiltration. This is based on the observation that the concentrate left behind after reverse osmosis or after ultrafiltration includes most of the substances that give the drink its beer taste. By adding water to such a concentrate, a drink is obtained which has a very low degree of alcohol but which retains the taste of beer.

The present invention stems from what might be termed opposite considerations.

SUMMARY OF THE INVENTION

In one aspect the present invention provides a method of processing an alcoholic starting liquid which has been obtained by fermenting a must or a wort, wherein said alcoholic starting liquid is subjected to a first processing step consisting in ultrafiltration or in reverse osmosis to give a concentrate and a permeate, the improvement wherein said permeate is further subjected to a second processing step consisting in reverse osmosis using a membrane which is substantially impermeable to alcohol, the concentrate from said second processing step being added to the concentrate obtained from said first processing step to provide a liquid having a higher degree of alcohol than the starting liquid.

The invention is thus based on the observation that some beer flavour substances are, in fact, present in the permeate of the initial reverse osmosis or ultrafiltration, and that there are exist semi-permeable membranes which can be used in a second reverse osmosis process to pass substantially nothing other then water. The liquid obtained by mixing the concentrates from both steps retains substantially all of the flavour substances and substantially all of the alcohol present in the original liquid, but contains considerably less water. Thus if the starting liquid was beer, the end product is a beer with a high degree of alcohol and flavour, i.e. a concentrated beer.

The concentrated beer may be stored and/or transported more cheaply than conventional beers. When the time comes to drink the concentrated beer, it can be diluted with a suitable quantity of water to reconstitute the original beer, or else a beer which has a greater or a lesser degree of alcohol, according to requirements.

The method in accordance with the invention may be applied to a conventional beer as the starting liquid, i.e. a beer containing about 5° (Gay-Lussac) of alcohol. The concentrated beer obtained by mixing the concentrates from the first and second reverse osmosis steps has a high alcohol content of about 10°.

By way of example, a membrane suitable for the second reverse osmosis step comprises a composite membrane having a support of polysulphone or like material covered with an active layer having a different chemical composition from the support. Such membranes are currently used for thorough desalinization of sea water.

The degree of alcohol in the second concentrate may be varied by suitable choice of the membrane for use in the second reverse osmosis step.

In another aspect the present invention provides for the mixture of the two concentrates obtained after a first application of the method to be subjected to the same process for a second time. Depending on the manner in which the installation is adjusted, "beers" can be obtained with a very wide range of alcohol contents, said "beers" containing substantially all of the original beer flavour substances and substantially no impurities. This can be benficial both to the taste of the end product and in meeting the strict requirements imposed by various legislations.

The method is also applicable to alcoholic liquids other than beer, and in particular to the liquid obtained by fermenting a malt-based wort which contains no hops. This liquid may be called "ale". The resulting beverage is naturally aerated, and is comparable to the mixture obtained by adding aerated water to conventional whisky. The degree of alcohol in this end product can be varied over a wide range by suitably adjusting the installation.

To obtain a beverage with a relatively high degree of alcohol, it is advantageous to apply a final process using a technique which is known per se in order to reduce the concentrations of anions and cations in the beverage to acceptable values.

In one implementation, the starting must or wort, eg. a wort as used for conventional beer, is processed by means of an enzyme such as amylo-glucosidase which transforms all of the sugars present into fermentable sugars.

The action of the yeast thus gives a liquid having a higher degree of alcohol than would have been obtained if the wort had not been treated with the enzyme. This more alcoholic liquid is used as the starting liquid for the method as explained above, with the advantages that hyperfiltration and ultrafiltration are facilitated by the absence of sugar, and that the cost of the process is considerably reduced.

The method may also be applied to wine as the starting liquid, in which case it is advantageous for the first step to be one of ultrafiltration. The result is a concentrated wine which costs less to transport, and from which the original wine can be reconstituted by adding water.

Alternatively, a wine with a greater or a lesser content of alcohol can be obtained by adding a lesser or a greater amount of water. Under these circumstances it is advantageous to use a softening treatment to remove at least a portion of the cations and of the anions that would otherwise be present.

Generally speaking the method in accordance with the invention is applicable to various alcoholic liquids obtained by fermenting grain or fruit.

It is always possible to subject the product obtained after a first application of the method to a second application of the method in order to increase the alcohol content of the final product.

The method may be applied in an installation which operates on a steady flow principle using separate machines for the intial ultrafiltration and for the subsequent reverse osmosis. Alternatively the same machine can be used in a batch mode and with suitable changes of membrane between steps.

The invention also provides alcoholic beverages and beverage concentrates obtained by applying the method defined above.

EXAMPLES

Example 1

A conventional beer having 5° (Gay-Lussac) alcohol content is used as the starting liquid. The beer is subjected to a first step of reverse osmosis using a semipermeable membrane based on cellulose acetate. The pressure upstream from the membrane is about 50 bars. The temperature is about 20° C.

The following are obtained:

(a) a concentrate having about 5° Gay-Lussac alcohol and containing all the nitrogenated material that generates foam, the bitter substances, the polyphenols, and the sugars that remain in the beer after fermentation. With the settings used, the concentrate comprises about 40% by volume of the starting liquid; and (b) a permeate comprising a mixture of water and alcohol, with 5° Gay-Lussac alcohol and about 60% of the starting volume.

The permeate is subjected to a second step of reverse osmosis, but the semi-permeable membrane used is a composite membrane, having a polysulphone support and in the form of a crossed flow spiral winding. The temperature is about 20° C. and the pressure upstream from the membrane is about 50 bars.

This treatment removes a portion of the water from the starting permeate, but leaves its other constituents of interest behind.

The concentrate resulting from said second reverse osmosis step contains not only ethyl alcohol, but also other alcohols from the fermentation together with beer flavouring substances. The concentrate is about 15% by volume of the starting beer and has about 20° Gay-Lussac alcohol content. It is added to the concentrate produced by the first step of reverse osmosis. The resulting concentrated beer contains all the substances characteristic of beer in the starting beer, but has approximately 10° Gay-Lussac alcohol content, i.e. it occupies about half the volume of the starting beer.

The resulting concentrate is thus cheaper and easier to transport than the original beer.

By adding the concentrate to the same quantity of water, a 5° Gay-Lussac beer is obtained which is indistinguishable from the starting beer.

Example 2

Proceed as in Example 1, except that the first step of the method, ie. the first reverse osmosis step, is replaced by a step of ultrafiltration.

Example 3

Begin by performing Example 1, and then take the resulting concentrated beer which has an alcohol content of about 10° Gay-Lussac, and apply a similar method to it as was applied to the starting beer. In particular, take the concentrated beer from Example 1, and subject it to ultrafiltration to obtain a concentrate and a permeate. Then subject the permeate to a further stage of reverse osmosis using a membrane having much smaller pores, eg. the above mentioned composite membrane. Add the concentrate from said further stage to the concentrate from the previous stage. A very concentrated beer is obtained with an alcohol content of about 13° Gay-Lussac.

Example 4

Ferment a wort as obtained from a hop-free malt and having a very high degree of fermentable sugars so that fermentation produces a liquid having about 7° Gay-Lussac alcohol content.

Subject this liquid to a first stage of ultrafiltration or of reverse osmosis. If reverse osmosis is chosen, use a semi-permeable membrane based on cellulose acetate. Use a temperature of about 20° C., and a pressure of about 50 bars.

The resulting concentrate has about 40% of the volume of the starting liquid, while the permeate has about 60%. The concentrate has about 7° Gay-Lussac alcohol content, as does the permeate which is constituted essentially by a mixture of water and alcohol.

Subject the permeate to a second stage of reverse osmosis using a composite membrane as described above. This second stage takes place at 20° C. and under a pressure of 50 bars. It provides a concentrate having an alcohol content of about 20° Gay-Lussac.

Mix the concentrates from both stages to obtain a liquid having an alcohol content of about 11.5° Gay Lussac.

If it is desired to increase the alcohol content of the liquid, it may be recycled through the method a second time, etc. The number of cycles through the method and/or the types of membrane used for the second reverse osmosis step(s) may be so chosen that the final beverage has at least 16° Gay Lussac alcohol content.

If the liquid is intended to be drunk without being diluted by water, it should be subjected to a deionising process before drinking, ie. it should be passed through a known cartridge to remove anions and to remove cations.

EXAMPLE 5

Proceed as in Example 3 or 4. Use an installation which is capable of performing a single cycle of the method, ie. apparatus having a first reverse osmosis apparatus using a cellulose acetate base membrane (or else an ultrafiltration apparatus), and a second reverse osmosis apparatus using a membrane with a polysulphone support. Use a force pump to take concetrate from the second apparatus and recycle it through the first apparatus, thereby subjecting it to a second cycle through the process, etc.

Good results may be obtained by feeding the first stage with 40% starting liquid and 60% recycled liquid from the force pump, with 40% of the liquid leaving the second apparatus being directed via a bleed circuit to an outlet from the installation.

This method of recycling may be applied to other examples.

I claim:

1. A method of processing an alcoholic starting liquid which has been obtained by fermenting a must or a wort, wherein said alcoholic starting liquid is subjected to a first processing step consisting in ultrafiltration or reverse osmosis giving a concentrate and a permeate, the improvement wherein said permeate is further subjected to a second processing step consisting in reverse osmosis using a membrane which is substantially impermeable to alcohol, the concentrate from said second processing step added to the concentrate obtained from said first processing step to provide a liquid having a higher degree of alcohol than the starting liquid and wherein the said obtained liquid with the higher degree of alcohol is further subjected to another cycle of said first and second processing steps, the concentrate from said second processing step added to the concentrate from said first processing step to yield a liquid with a further increased alcohol content.

2. An alcoholic liquid obtained by performing the method of claim 1.

3. A beverage obtained by deionizing the alcoholic liquid of claim 2.

4. A method of manufacturing an alcoholic liquid, wherein the method comprises the steps of: taking a must or a wort containing fermentable sugars; fermenting said must or wort; subjecting the resulting alcoholic liquid to ultrafiltration to obtain a concentrate and a permeate; subjecting the permeate from said ultrafiltration to reverse osmosis using a membrane that passes substantially only water; and adding the concentrate obtained from the reverse osmosis to the concentrate obtained from the ultrafiltration.

5. A method according to claim 4, wherein said ultrafiltration step is replaced by a reverse osmosis step using a membrane that passes both water and alcohol but which retains the bulk of products that determine the taste and the odour of the liquid.

6. A method according to claim 4, wherein amyloglucosidase is added to the initial must or wort before fermentation to improve the fermentability of the sugars therein.

7. An alcoholic liquid obtained by performing the method according to claims 4, 5 or 6.

8. A method accordng to claim 4, comprising the additional steps of: subjecting the mixture of the two concentrates to ultra-filtration to obtain a concentrate and a permeate; subjecting the permeate from said ultrafiltration to reverse osmosis using a membrane that passes substantially only water; and adding the concentrate obtained from the reverse osmosis to the concentrate obtained from the ultra-filtration.

9. An alcoholic liquid obtained by performing the method according to claim 8.

10. A beverage according to claim 9 which is deionized.

* * * * *